United States Patent
Weinert et al.

(10) Patent No.: US 10,082,031 B2
(45) Date of Patent: Sep. 25, 2018

(54) ROTOR OF A TURBINE OF A GAS TURBINE WITH IMPROVED COOLING AIR ROUTING

(71) Applicant: Rolls-Royce Deutschland Ltd & Co KG, Blankenfelde-Mahlow (DE)

(72) Inventors: Markus Weinert, Rangsdorf (DE); Tobias Leymann, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 223 days.

(21) Appl. No.: 15/059,520

(22) Filed: Mar. 3, 2016

(65) Prior Publication Data

US 2016/0258294 A1  Sep. 8, 2016

(30) Foreign Application Priority Data

Mar. 4, 2015  (DE) .................. 10 2015 203 871

(51) Int. Cl.
*F01D 5/22* (2006.01)
*F01D 5/08* (2006.01)
(Continued)

(52) U.S. Cl.
CPC ............. *F01D 5/081* (2013.01); *F01D 5/10* (2013.01); *F01D 5/22* (2013.01); *F01D 11/006* (2013.01);
(Continued)

(58) Field of Classification Search
CPC ... F01D 5/22; F01D 5/081; F01D 5/10; F01D 11/006; F05D 2240/55; F05D 2240/81;
(Continued)

(56) References Cited

U.S. PATENT DOCUMENTS

| 7,163,376 | B2 * | 1/2007 | Itzel | .......................... | F01D 5/16 |
| | | | | | 416/193 A |
| 7,762,773 | B2 * | 7/2010 | Liang | ........................ | F01D 5/22 |
| | | | | | 415/115 |

(Continued)

FOREIGN PATENT DOCUMENTS

| DE | 102005054823 A1 | 6/2006 |
| DE | 102009004792 A1 | 7/2010 |
| WO | WO2007063128 A1 | 6/2007 |

OTHER PUBLICATIONS

European Search Report dated Oct. 14, 2016 for counterpart European Application No. 16158544.3.
(Continued)

*Primary Examiner* — Richard Edgar
(74) *Attorney, Agent, or Firm* — Shuttleworth & Ingersoll, PLC; Timothy Klima (57) ABSTRACT

A rotor of a turbine of a gas turbine, having a rotor hub and a plurality of blade platforms, each carrying at least one turbine blade, and having one each cooling air chamber for passing cooling air formed by adjacent blade platforms. At least one damping element and/or sealing element is arranged radially beneath a platform intermediate gap provided between adjacent blade platforms. The cooling air chamber and/or the platform intermediate gap are designed such that starting from a side of the blade platform facing the adjacent blade platform, at least one outflow pocket open to the platform upper side and connected to the cooling air chamber is formed, and at least one cooling air pocket opened radially inwards to the cooling air chamber is provided in the wall of the cooling air chamber and opens towards the damping element and/or the sealing element or the platform intermediate gap.

15 Claims, 12 Drawing Sheets

(51) Int. Cl.
   *F01D 11/00*   (2006.01)
   *F01D 5/10*   (2006.01)
(52) U.S. Cl.
   CPC ...... *F05D 2240/55* (2013.01); *F05D 2240/81* (2013.01); *F05D 2260/201* (2013.01); *Y02T 50/673* (2013.01); *Y02T 50/676* (2013.01)
(58) Field of Classification Search
   CPC . F05D 2260/201; Y02T 50/673; Y02T 50/676
   See application file for complete search history.

(56) References Cited

U.S. PATENT DOCUMENTS

2009/0263235 A1   10/2009   Tibbott et al.
2010/0124508 A1   5/2010    Liang

OTHER PUBLICATIONS

German Search Report dated Nov. 3, 2015 for related German application No. 10 2015 203 871.8.

\* cited by examiner

ROTOR OF A TURBINE OF A GAS TURBINE WITH IMPROVED COOLING AIR ROUTING

This application claims priority to German Patent Application 102015203871.8 filed Mar. 4, 2015, the entirety of which is incorporated by reference herein.

This invention relates to a rotor of a high-pressure turbine and/or an intermediate-pressure turbine and/or a low-pressure turbine of an aircraft gas turbine or a stationary industry gas turbine.

In detail, the invention relates to the design of inner and/or outer blade platforms, on each of which one or more turbine blades are provided. A cooling air chamber is provided between the blade platforms to pass cooling air between adjacent blade platforms. A damping element or a sealing element/seal-wire extending in the radial direction and arranged on the underside of the blade platforms is located in the area of the cooling air chamber.

It is known from the state of the art to cool, in view of the high temperatures, the rear part of a blade platform of a high-pressure turbine rotor. To do so, damping elements are used which are provided with through-flow recesses for passing through cooling air so that the maximum operating temperature of the blade material is not exceeded and/or oxidation reducing its service life is prevented. The through-flow recesses, which are designed duct-like, ensure an additional cooling air mass flow out of the secondary air system of the aircraft gas turbine. The additional cooling air mass flow exits here between two adjacent blade platforms and reduces the platform metal temperature by convection cooling. Furthermore, the cooling air mass flow generates a cooling air film between the hot gas flowing through the turbine and the blade platform, to further reduce the metal temperature of the platform and in so doing to prolong the service life of the turbine blade.

The embodiment according to the state of the art results in a number of disadvantages. On the one hand, the production of through-flow recesses or cooling ducts on the damping element is complex and cost-intensive. On the other hand, a platform intermediate gap between adjacent blade platforms must be designed larger in order to ensure the minimum cooling mass flow at all operating points and under all tolerance cases. This leads to disadvantages for the aerodynamic performance and for the efficiency of the high-pressure turbine. In addition, the formation of a cooling air film is negatively impaired by the edge of the blade platform, and there is no optimum cooling air outflow. The enlarged platform intermediate gap results in a reduced contact surface between the blade platform and the damping element, so that a reduced damping effect occurs. Furthermore, the cooling duct cross-section can only be enlarged in the radial direction, without reducing the damping surface. In the state of the art, this can only be done in the radially inward direction. This leads to further flow losses, since the cooling air has to flow over an even larger stage in order to reach the platform. In addition, the through-flow recesses or cooling ducts of the damping element can be blocked by abraded matter or foreign particles. The material of the damper is subject to greater wear compared with the blade material. A further reduction in platform cooling can result from wear of the damping element, in particular of the walls or edges of the through-flow recesses and cooling ducts, respectively. Furthermore, the cooling method according to the state of the art cannot be implemented using seal-wires, as they cannot contain any sufficiently large cooling ducts.

It is known from DE 10 2005 054 823 A1 to provide between adjacent blade platforms a gap through which cooling air can flow radially to the outside. During thermal expansion of the blade platforms, the width of the gap is reduced, so that less and less air can be discharged. Also, the slot between the blade platforms is completely or partially closed by a damper pin, such that only a cooling air leakage flow can exit. The exit of the cooling air from this gap does not enable targeted routing of the cooling air onto the surface of the blade platform.

WO 2007/063 128 A1 shows in a similar design only a gap between adjacent rotor blade platforms which increasingly closes during thermal expansion of the blade platforms and then either permits an outflow of cooling air only to a limited extent or prevents it completely. An outflow of cooling air is therefore also dependent on the platform intermediate gap.

A further design is shown in US 2009/0 263 235 A1. Here too, a gap is provided between the adjacent blade platforms and also closes during thermal expansion of the blade platforms. The gap is arranged at an angle to the surface of the blade platforms.

The object underlying the present invention is to provide a rotor of the type mentioned at the beginning, which while being simply designed and easily and cost-effectively producible enables an efficient reduction of the surface metal temperature of the inner or outer blade platforms.

It is a particular object to provide a solution to the above problems by a combination of features disclosed herein. Further advantageous embodiments will become apparent from the present disclosure.

In accordance with the invention, it is provided that starting from a side of the blade platform facing the adjacent inner and/or outer blade platform, at least one outflow pocket open to the platform upper side and connected to the cooling air chamber is formed. The outer blade platform is also referred to as shroud segment or shroud. The outer turbine platforms are usually designed such that the platform intermediate gap closes during operation (in the hot condition), so that cooling of the hot gas side of the outer turbine platform is not possible without the outflow pocket.

In accordance with the invention, an outflow pocket is thus provided on the surface of the respective blade platform. This outflow pocket is thus arranged radially on the outside, on the surface or upper side of the blade platform, and extends both in the axial direction and in the circumferential direction. The depth of the outflow pocket is provided in the radial direction. The result is therefore an outflow pocket provided for the outflow of the cooling air which extends in all three dimensions and is shaped for an optimized flow. Unlike in the state of the art, in which only simple slots or grooves are provided between the blade platforms, the outflow pocket in accordance with the invention thus permits, even when the platform intermediate gap is closed due to thermal expansions, direct and targeted film cooling of the platform upper side. Whereas in the state of the art the slots or grooves between the blade platforms necessitate multiple deflections in the flow of cooling air, the possibility is created in accordance with the invention of achieving at every operating point an undisrupted outflow of the cooling air without any deflection.

It is thus provided in accordance with the invention that the cooling air is passed through the outflow pockets and in this way an exit of the cooling air is provided and in particular a film of cooling air is formed on the platform upper side.

Furthermore, with inner blade platforms, the present invention provides a cooling air pocket opened radially inwards to the cooling air chamber in the wall of the cooling air chamber, said cooling air pocket opening towards the damping element and/or the platform intermediate gap. Due to this additional cooling air pocket cooling air is introduced into the area of the platform intermediate gap in an optimum manner, without the need of providing through-flow recesses in the damping element.

With the embodiment in accordance with the invention, it is possible to further reduce the surface metal temperature on the platform compared with cooling according to the state of the art, and accordingly to use less secondary air mass flow for cooling down to acceptable operating temperatures.

In accordance with the invention, the total flow duct for cooling air is formed using the adjacent blade platforms, their cooling air pockets and outflow pockets. Additionally, the cooling airflow is routed through contact surfaces of the damping element. In accordance with the invention, expensive-to-manufacture internal and/or closed cooling air ducts can thus be dispensed with.

The cooling air pocket of the inner plate platform can, in accordance with the invention, be designed convergent or divergent. It is furthermore particularly favourable when the outflow pocket is opened or arranged at the shallowest possible angle, ideally at an angle between 0° and 35°, to the platform upper side. Alternatively, the outflow pocket can also be designed as a free-form surface for improved flow, with this design preferably being provided in both planes. These measures improve the adherence of a cooling air film on the surface of the blade platform. It also helps to improve the flow when the outflow pocket and/or the cooling air pocket are each provided with free-formed surfaces and/or walls. In particular, a divergent shape of the cooling air pocket (similar to a diffuser) permits on the one hand a reduction in speed and on the other hand an increase in the pressure of the cooling air mass flow, leading to an improved formation of the film. Seen in a radial section and in a top view (cf. FIGS. 3 and 4), the outflow pocket is profiled such that it is tangentially approximating both to the curvature of the blade platform upper side and the main flow (hot gas).

With the embodiment in accordance with the invention, only low pressure losses of the cooling airflow result, as this flow only has to be deflected very little or not at all. In contrast to this, the designs in the state of the art show the requirement to deflect the cooling airflow several times, in particular to apply the exiting cooling airflow onto the surface of the blade platform and/or to pass it around a sealing element. This also results in a greater risk of a blockage due to pollution. This risk is largely minimized in accordance with the invention.

It can furthermore be provided that the described design of the outflow pocket and/or the cooling air pocket is provided in similar form on the outer hot gas platform surface (blade tip). The outflow pocket can also have a further through-flow recess in an integral design with predominantly radial orientation.

In accordance with the invention, it is possible to use, instead of a damping element, a sealing element or a seal-wire, which is advantageous in particular for smaller blades, as the latter often do not require any vibration damping, so that no damping element is used. The optimised flow routing as described in the cooling air pocket and in the outflow pocket remain unaffected by this, so that the invention affords the same effects and advantages in both a damping element and a sealing element.

The present invention is described in the following on the basis of an exemplary embodiment in light of the accompanying drawing. In the drawing, FIG. 4 shows a sectional view, by analogy with FIG. 2, of the embodiment shown in FIG. 3.

Figure 1:
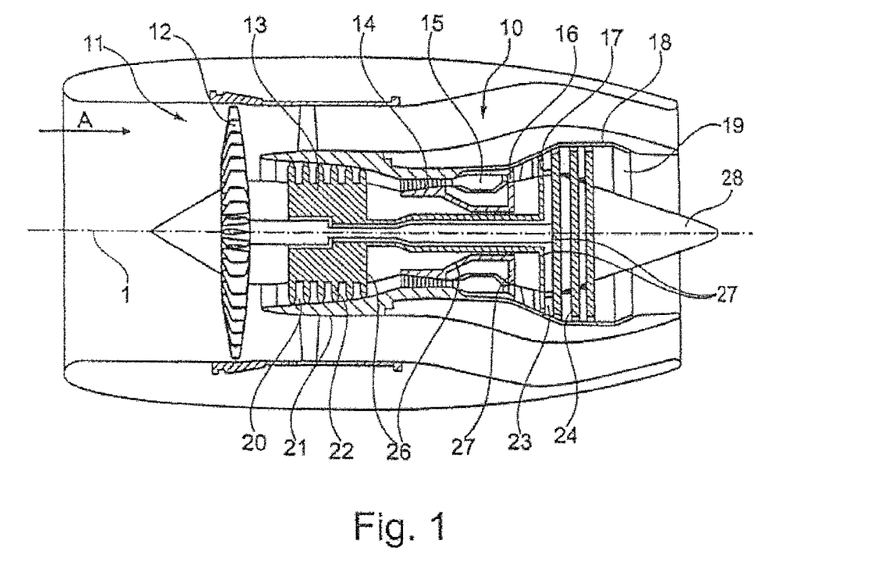
FIG. 1 shows a schematic representation of a gas-turbine engine in accordance with the present invention.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the core engine casing 21 into an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

Figure 2:
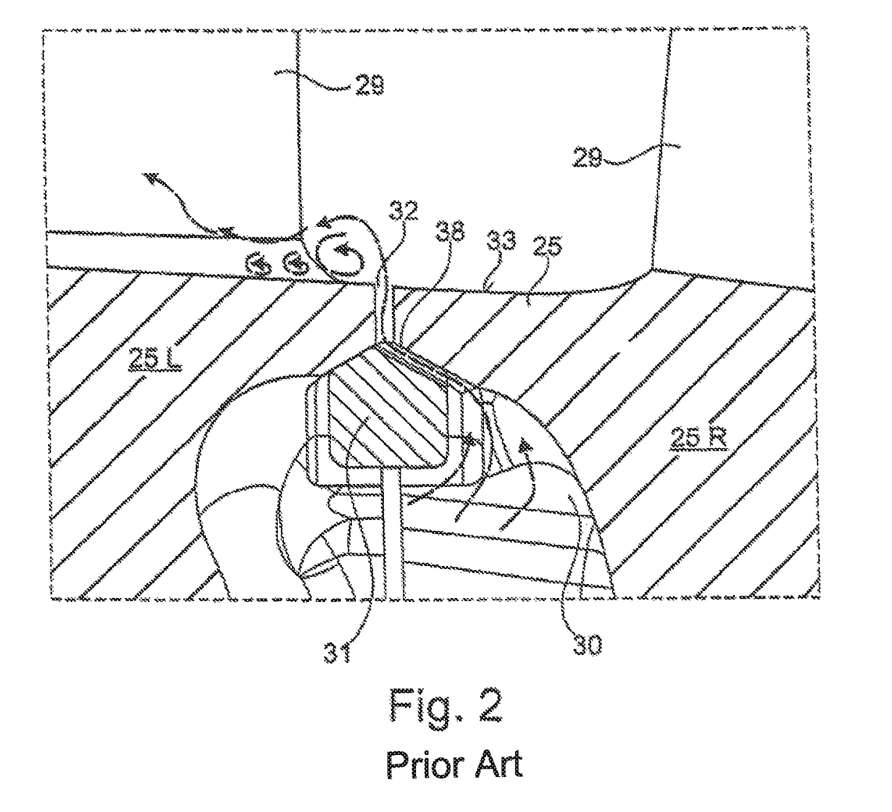
FIG. 2 shows a simplified sectional view of a rotor in accordance with the state of the art in a radial sectional plane.

FIG. 2 shows a sectional view according to the state of the art, in a sectional plane radial relative to the engine axis. Adjacent blade platforms 25 are shown here, each provided with a turbine blade 29. A cooling air chamber 30 or a cooling air plenum extending substantially in the circumferential direction is provided between the blade platforms 25 (left-hand blade platform 25L, right-hand blade platform 25R). Furthermore, a damping element 31 extending in the axial direction or radial direction is arranged between adjacent blade platforms 25 and is provided with through-flow recesses 38. As shown in FIG. 2, cooling air flows through the through-flow recesses (cooling ducts) of the damping element 31 and through a platform intermediate gap 32 formed between the blade platforms 25. The cooling air exits here substantially in the radial direction and is heavily swirled, so that optimum cooling of the platform upper side 33 is not possible.

As is shown in particular by the illustration in FIG. 2, the outflow pocket 34 is incorporated three-dimensionally as a free-form surface into the surface of the blade platform, so that the cooling air can be effectively applied as a cooling air film onto the surface of the blade platform. The supply of cooling air is achieved, as described in the following, not through the platform intermediate gap as in the state of the art, but instead through the outflow pocket. For that reason, there is no risk either in accordance with the invention that the cooling air supply is reduced or completely interrupted when the platform intermediate gap is closed due to thermal expansion of the blade platforms.

Figure 3:
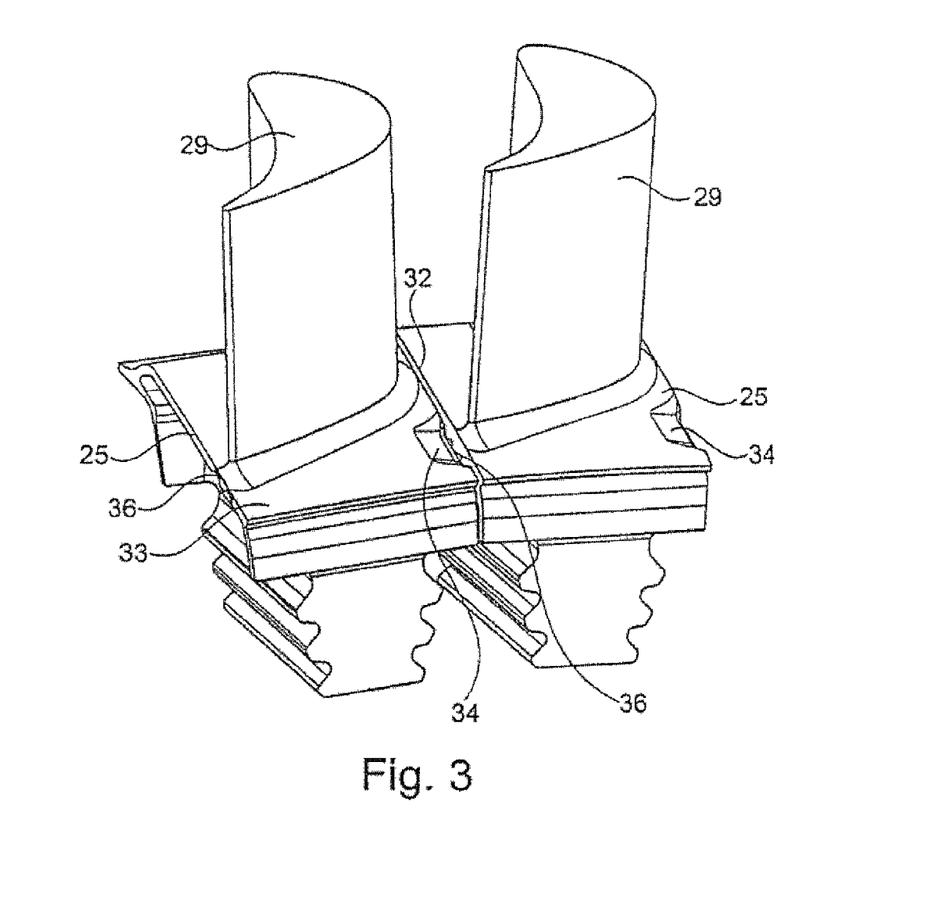
FIG. 3 shows a simplified perspective representation of two adjacent blade platforms designed in accordance with the present invention.

FIG. 3 shows an exemplary embodiment of the invention in a perspective view, where at the rim area of the blade platform 25 shown on the left in FIG. 3 an outflow pocket 34 is provided, through which cooling air exiting from outflow openings 36 is passed and routed to the platform upper side 33. The exiting cooling air follows the blade profile or the main flow (cf. FIG. 6) and flows according to FIG. 3 substantially to the left and/or from the concave blade side to the convex blade side.

FIG. 4 shows a sectional view, by analogy with FIG. 2. This illustrates that cooling air flows in through the cooling air chamber 30. The cooling air is passed through a cooling air pocket 35 provided in the area of the cooling air chamber 30 on the underside of the blade platform 25 (left-hand blade platform 25L, right-hand blade platform 25R). It can be seen that the cooling air pocket 35 can be positioned in an area located further radially outwards with a larger radius than the through-flow recesses 38 of the damping element 31 (see FIG. 2) known from the state of the art. The result is a better flow onto the concave inner platform side. To provide the cooling air pocket 35, the wall thickness of the blade platform must only be reduced locally. According to the state of the art, it is not possible to arrange the entire damper contact surface any closer relative to the platform upper side in order to create improved cooling air flow properties without having to accept other disadvantages (e.g. integrity problems). The shape of the cooling air pockets 35 (cooling ducts) can differ in design, for example have a rectangular cross-section, an oval cross-section, be angular or rounded. It is furthermore possible to vary the angle between the cooling air pocket 35 and the platform upper side 33, to create optimum flow and mass flow conditions for the respective application.

Figure 7:
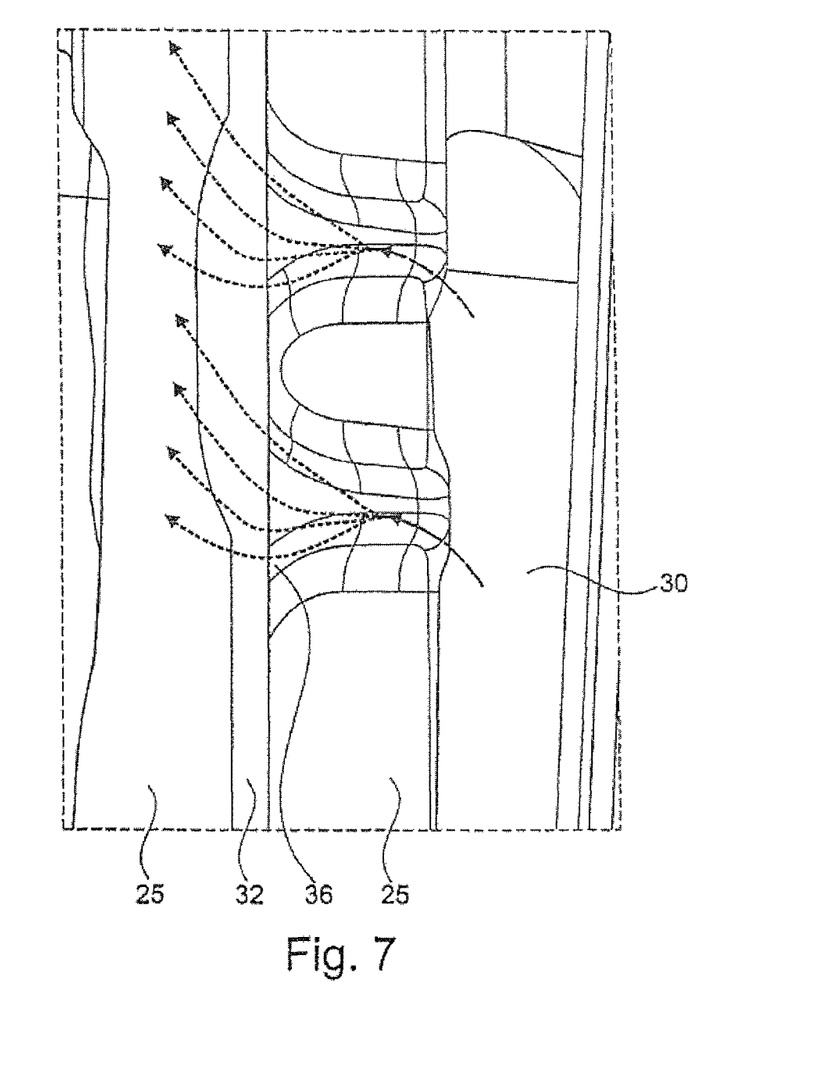
FIG. 7 shows a bottom view, by analogy with FIG. 6.

In accordance with the invention, it is thus possible to make the shape of the cooling air pockets 35 more variable than would be possible with the through-flow recesses (cooling ducts) in the damping element 31. It is thus provided in accordance with the invention that the cooling air pockets 35 for improving the flow paths and for affecting the temperature and pressure are designed convergent or divergent or parallel or that rounded forms are used. A divergent shape, which is designed rounded as shown, has proven particularly advantageous for reducing the speed and the dynamic pressure of the cooling airflow and thereby increasing the static pressure and reducing the temperature. Furthermore, a more even distribution of the cooling air over the axial length of the platform is achieved, see also FIG. 7 in this connection, which shows in a bottom view and looking in the radial direction the embodiment of FIG. 4.

In accordance with the invention, the number and the position of the cooling air pockets can be varied over the entire axial length of the blade platform depending on the cooling requirements.

FIG. 4 furthermore shows that in the adjacent blade platform (left-hand blade platform as per FIG. 4, convex side) an outflow pocket 34 is formed, into the inflow opening 37 of which the cooling air flowing out of the outflow opening 36 of the cooling air pocket 35 enters. This cooling air is routed at a shallow angle to the surface or platform upper side 33, such that both favourable flow conditions and optimized temperature and pressure conditions result. The outflow pocket 34 ensures a direct and unhindered flow of cooling air between the inlet of the blade root cavity (cooling air chamber 30 or cooling air plenum) and the outlet from the convex platform upper side 33. As shown in FIG. 4, the cooling air film can propagate better on the platform upper side 33 and is less prone to separation. In particular, these features ensure an increase in cooling effectiveness. The shape of the outflow pocket 34 can be adapted to the requirements, but is however preferably designed with the shallowest possible rise and heavily rounded to prevent separation of the cooling air film as well as separation edges.

A further advantage of the outflow pocket 34 is that tolerance-related radial steps between adjacent blade platforms 25 can be reduced, to prevent the main flow separating due to an edge and so causing additional flow losses with the reduction in turbine efficiency thereby involved.

The embodiment of the outflow pocket 34 can be varied in shape, geometry, angle, number, length and position to conform to the cooling requirements. It is for example possible in accordance with the invention to provide the outflow pocket 34 over the entire axial length of the blade platform 25. As a result, on the one hand the losses due to the tolerance-related steps between adjacent blade platforms 25 are reduced and on the other hand the front part too of the blade platform 25 is effectively cooled.

Figure 5:
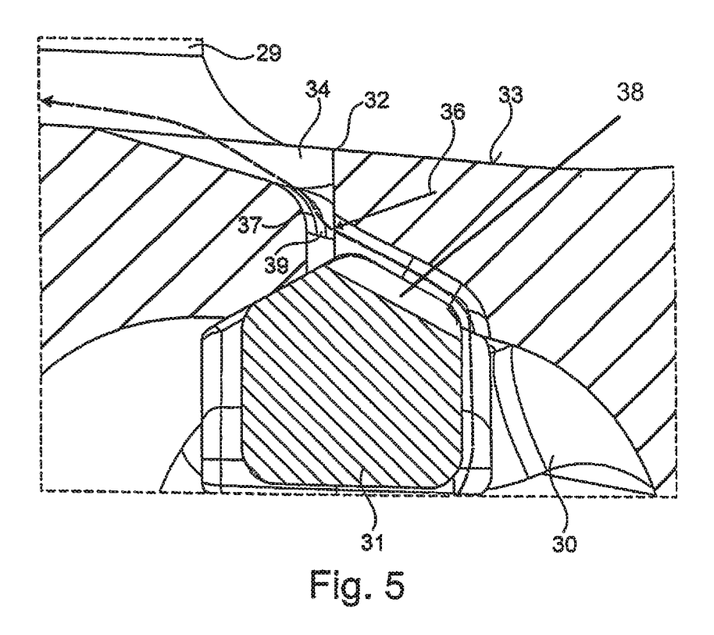
FIG. 5 shows a further sectional view, by analogy with FIG. 2, with closed platform intermediate gap.

FIG. 5 shows a view similar to that in FIG. 4, where the platform intermediate gap 32 is closed. With a configuration of this type, it is possible to provide a second outflow pocket 39 on the platform upper side 33 which ensures that even with a closed platform intermediate gap 32 between adjacent blade platforms a sufficient cooling air mass flow is possible. This effect occurs in particular at transient points of high acceleration of the aircraft gas turbine, for example during the transition from idling to maximum power when taking off. In these operating states, the platform metal temperature attains its highest values, while the turbine disk has not yet completely warmed up and expanded radially. Compared with the embodiment according to the state of the art, in accordance with the invention no minimum platform intermediate gap 32, which would lead to unwelcome leakage in the other operating points of the aircraft gas turbine and also at other geometric points along the blade platform 25, is required to ensure the cooling air mass flow.

Figure 6:
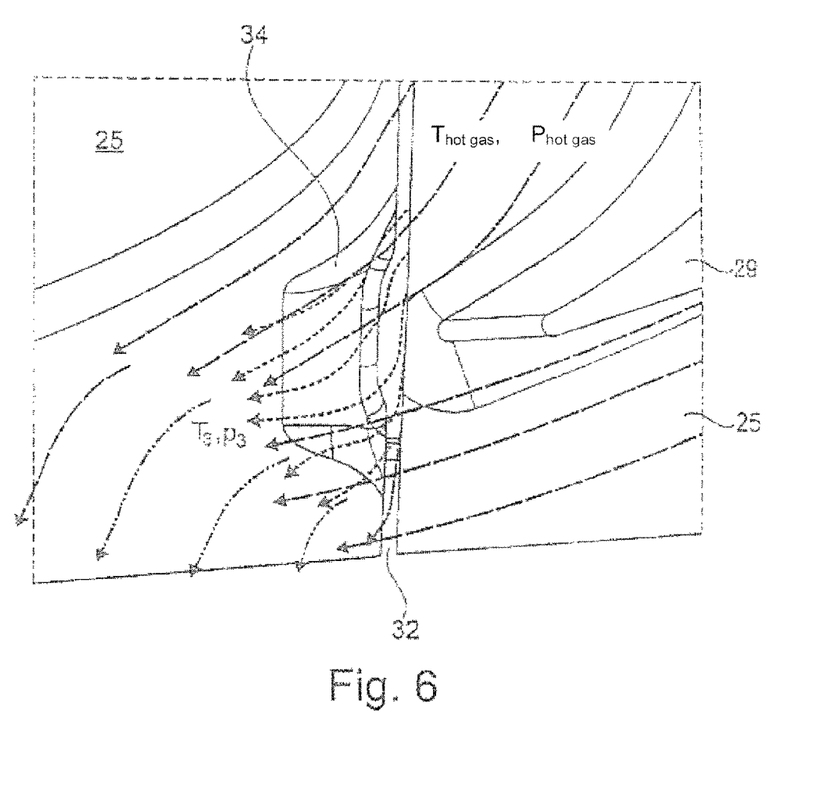
FIG. 6 shows a top view of the arrangement in accordance with FIG. 3 in the radial direction.
Figure 8:
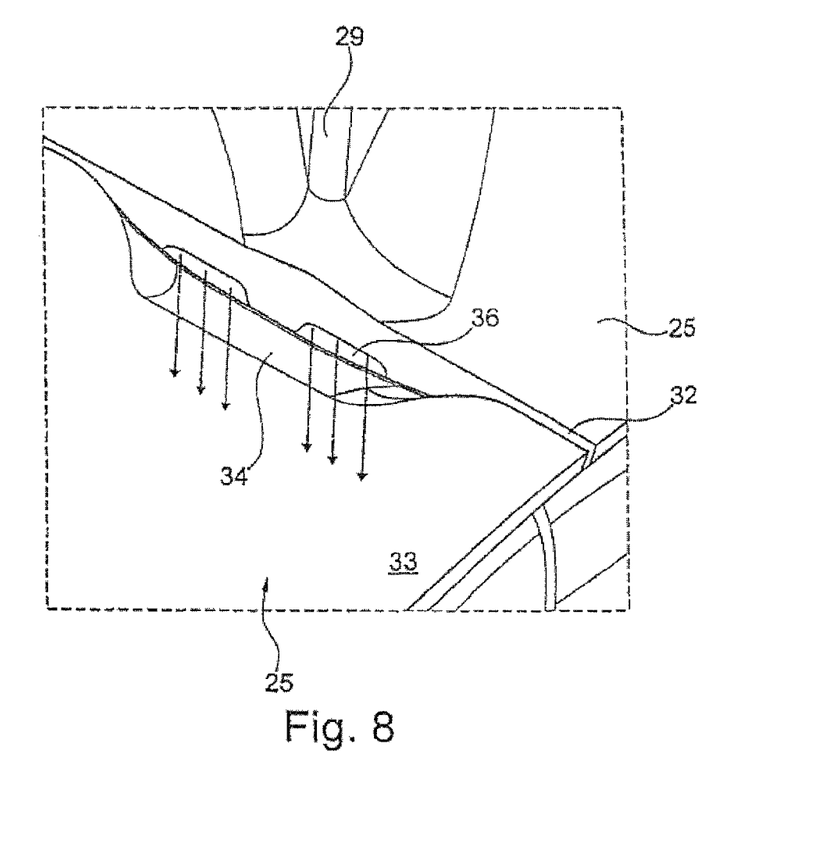
FIG. 8 shows a perspective detailed view, by analogy with FIG. 3.

FIGS. 6 and 8 each show detailed views, seen from the convex side of the blade platform 25. FIG. 6 shows in particular the hot gas flow and the exiting cooling air flow. FIG. 8 makes clear how the cooling airflow exits from the outflow opening 36 and is routed into the outflow pocket 35.

The solution in accordance with the invention is based on the fact that air from the cooling air chamber 30 or the cooling air plenum is supplied at higher pressure and flows to the platform upper side 33 of the blade platform 25 at lower pressure. In detail, this takes place as shown in FIGS. 4 and 6.

The cooling air is supplied from the secondary air system of the gas turbine at the temperature $T_1$ and the total pressure $p_1$. It is located inside the cooling air chamber 30 or cooling air plenum and is supplied via the cooling air pocket 35 (position (1)) to the platform intermediate gap 32 (position (2)). Due to the divergent shape of the cooling air pocket 35 at position (1), the temperature of the cooling air initially drops, however heats up due to impingement cooling effects on the concave platform underside, such that a temperature $T_2$ is attained. The dynamic pressure at position (2) (platform intermediate gap 32) is reduced due to the divergent shape of the cooling air pocket 35, such that the static pressure rises and a total pressure $p_2$ is attained, where $p_1 > p_2$. By means of the outflow pocket 34 (position (3)), the air is supplied to the convex platform upper side of the adjacent turbine blade, partially mixes with the hot gas of the hot gas flow and forms a cooling film between the platform upper side 33 and the hot gas with a temperature $T_3$ and a total pressure $p_a$ (position (4)), where $p_2 > p_3$ and $T_2 < T_3$. With the embodiment in accordance with the invention, it is possible to further reduce the surface metal temperature at position (4) (platform) or to use correspondingly less secondary air mass flow for cooling.

Figure 9:
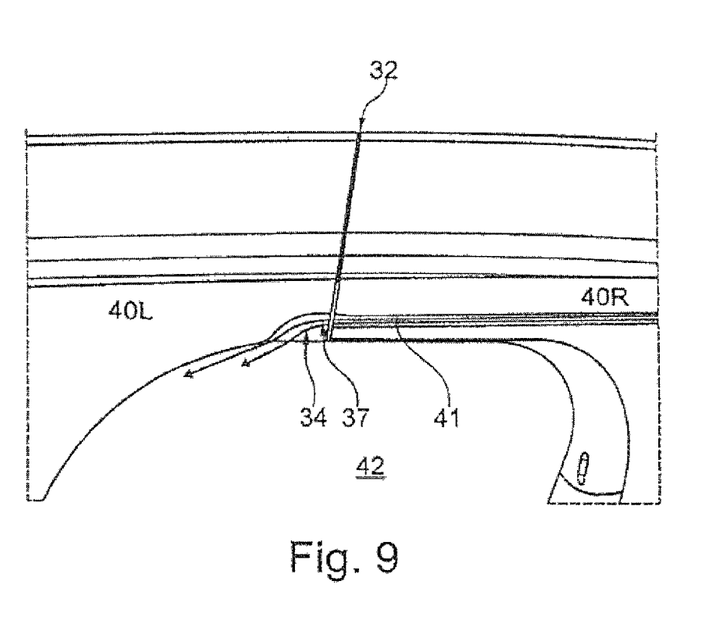
FIG. 9 shows a simplified representation of an exemplary embodiment in accordance with the present invention on an outer platform of a turbine blade.
Figure 10:
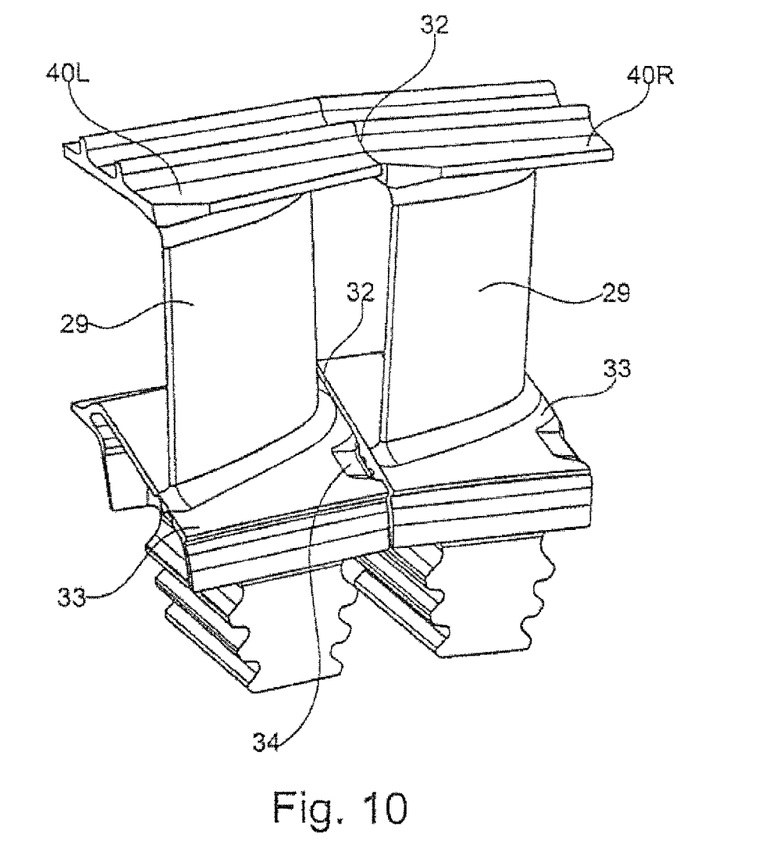
FIGS. 10 to 12 show perspective views of blades having an outer blade platform, by analogy with FIG. 9 or FIG. 3.
Figure 11:
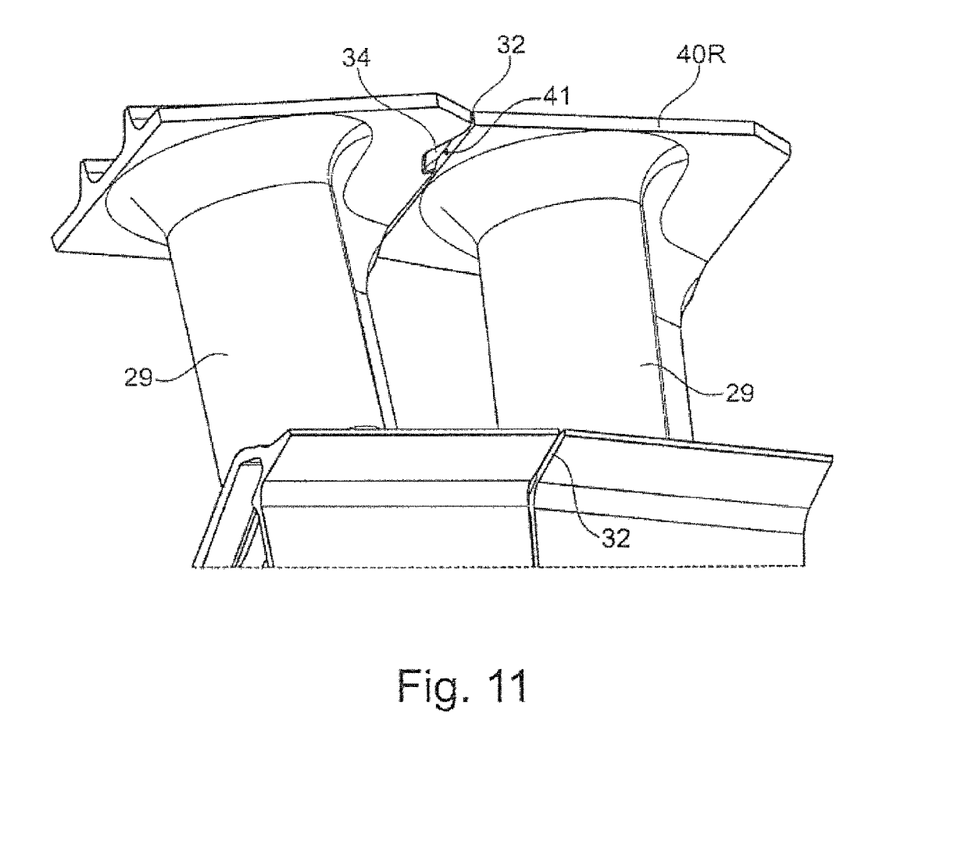
Figure 12:
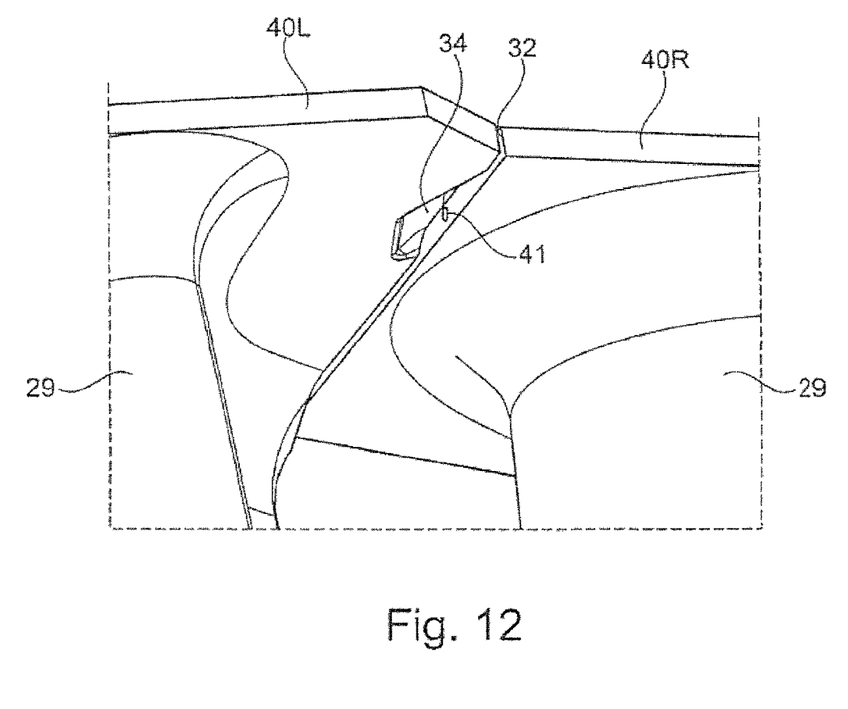

FIGS. 9 to 12 show in a simplified view an exemplary embodiment where an outer platform 40 (also referred to as shroud segment or shroud) of the turbine rotor blade 29 is provided with a cooling air hole 41 through which cooling air flows through an inflow opening 37 into an outflow pocket 34. In a comparison with FIG. 5, FIG. 9 makes clear that the invention can be implemented on both an inner and an outer blade platform. FIGS. 9 to 10 show in detail the solution in accordance with the invention in a perspective view. For that reason, the arrangement and shape of the outflow pocket 34 are made clear in particular.

In accordance with the invention, the following advantages result:

In accordance with the invention, there is a direct connection between the inlet and the outlet of the cooling air, leading to a reduced risk of separation and to lower flow losses.

The better formation of the cooling air film due to the combination of the cooling air pocket 35 and the outflow pocket 34 (convex and concave cooling gap) results in a markedly higher cooling effect, since the cooling airflow can better adhere to the platform upper side 33, without separation or losses.

The embodiment in accordance with the invention can easily be produced with existing manufacturing methods, and can for example be cost-effectively achieved when casting the blade platforms.

In accordance with the invention, a reduction of the platform intermediate gap 32 by a second concave cooling gap (second outflow pocket 39) is possible as shown for example in conjunction with FIG. 5. This leads, due to a reduction in aerodynamic losses, to an increase in the efficiency of the high-pressure turbine.

The cooling provided in accordance with the invention is considerably reduced in its dependence on the wear behaviour of the damping element 31, in particular on the wear of the damper contact surface, as a result of which the cross-section of the platform intermediate gap 32, and hence the cooling air mass flow in the state of the art is changed.

The solution in accordance with the invention is furthermore less prone to contamination and blockage due to foreign objects. The ratio between width and height of the cooling air pocket can be changed without negatively affecting the radial position, in order to achieve a reduction in the proneness to blockages.

The result is a greater flexibility in the geometry of the cooling ducts, in particular of the cooling air pocket 35 and the outflow pocket 34. This is advantageous in an integral design in particular. The overall result is targeted optimization of the platform cooling.

In accordance with the invention, the number and size of the outflow pockets and of the cooling air pockets are independent of the contact surface of the damping element and/or the sealing element.

The invention assures a reduction in the flow losses with tolerance-related radial steps between adjacent blade platforms.

The invention also generates, due to the targeted cooling air mass flow out of the outflow pocket (in the main flow direction of the hot gas), an additional torque and hence additional work to improve the turbine efficiency.

The invention is applicable to both, aircraft gas turbines and stationary industry gas turbines or, generally speaking, to gas turbines or turbomachines.

In accordance with the invention, cooling of the platform surface can be achieved both by means of damping elements (31) and by simple sealing elements or seal-wires.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Core engine casing
22 Compressor rotor blades
23 Stator vanes
24 Turbine rotor blades
25 Blade platform
26 Compressor drum or disk
27 Turbine rotor hub
28 Exhaust cone
29 Turbine blade
30 Cooling air chamber
31 Damping element
32 Platform intermediate gap
33 Platform upper side
34 Outflow pocket
35 Cooling air pocket
36 Outflow opening
37 Inflow opening
38 Through-flow recess
39 Second outflow pocket
40 Outer blade platform of the turbine rotor blade
41 Cooling air hole in the outer platform
42 Hot gas side

What is claimed is:
1. A rotor of a turbine of a gas turbine, comprising:
a turbine rotor hub, a plurality of blade platforms arranged around a circumference of the turbine rotor hub, each of plurality of blade platforms carrying a turbine blade, a plurality of cooling air chambers, with each of the cooling air chambers positioned between a respective pair of adjacent blade platforms of the plurality of blade platforms, each of the cooling air chambers for passing through cooling air, a plurality of platform intermediate gaps, with each of the platform intermediate gaps positioned between the respective pair of the adjacent blade platforms of the plurality of blade platforms, at least one chosen from a plurality of damping elements and a plurality of sealing elements, with each of the plurality of damping elements or each of the plurality of sealing elements arranged radially beneath a respective one of the plurality of platform intermediate gaps, a plurality of outflow pockets, with each of the outflow pockets positioned adjacent the respective one of the plurality of platform intermediate gaps, open to a platform upper side and connected to a respective one of the plurality of cooling air chambers, a plurality of cooling air pockets, with each of the cooling air pockets connecting between a respective one of the plurality of outflow pockets and a respective one of the cooling air chambers, each of the cooling air pockets provided in a wall of a respective one of the cooling air chambers and opening radially inwardly towards the respective one of the cooling air chambers and also opening toward at least one chosen from a respective one of the plurality of damping elements, a respective one of the plurality of sealing elements and the respective one of the plurality of platform intermediate gaps;

wherein the plurality of outflow pockets are arranged at a shallow angle of between 0-35° or tangentially to respective upper sides of the plurality of blade platforms.

2. The rotor in accordance with claim 1, wherein the each of the cooling air pockets is provided entirely in the wall of the respective one of the cooling air chambers and wherein the at least one chosen from the plurality of damping elements and the plurality of sealing elements is free of through-flow recesses thereon.

3. The rotor in accordance with claim 1, wherein at least one of the plurality of cooling air pockets is convergent or divergent as it moves away from the respective one of the cooling air chambers.

4. The rotor in accordance with claim 1, wherein at least one of the plurality of cooling air pockets is at an angle parallel or divergent relative to at least one chosen from one of the plurality of damping elements and one of the plurality of sealing elements.

5. The rotor in accordance with claim 1, wherein at least one of the plurality of outflow pockets includes at least one chosen from rounded edges and surfaces freely merging into one another.

6. The rotor in accordance with claim 1, wherein a wall of at least one of the plurality of cooling air pockets is rounded or includes surfaces freely merging into one another.

7. The rotor in accordance with claim 1, wherein one of the plurality of cooling air pockets includes an outflow opening positioned in one of the plurality of blade platforms and one of the outflow pockets positioned on an adjacent one of the plurality of blade platforms includes an inflow opening, and the outflow opening is positioned exactly opposite the inflow opening.

8. The rotor in accordance with claim 1, wherein at least one of the plurality of outflow pockets includes an integral further outflow pocket with a predominantly radial orientation.

9. The rotor in accordance with claim 1, wherein at least one of the plurality of blade platforms includes at least one chosen from a second plurality of the plurality of outflow pockets arranged along an axial length of the at least one of the plurality of blade platforms and a single one of the plurality of outflow pockets covering a majority of the axial length of the at least one of the plurality of blade platforms.

10. The rotor in accordance with claim 1, wherein a second plurality of the plurality of cooling air pockets are arranged along an axial length of at least one of the plurality of blade platforms.

11. The rotor in accordance with claim 10, wherein the second plurality of cooling air pockets partially or completely merge into one another.

12. The rotor in accordance with claim 1, wherein the at least one chosen from the plurality of damping elements and the plurality of sealing elements includes through-flow recesses thereon.

13. The rotor in accordance with claim 1, wherein at least one chosen from the plurality of outflow pockets and the plurality of cooling air pockets are provided on radially outer hot gas platform surfaces.

14. A rotor of a turbine of a gas turbine comprising:
a turbine rotor hub,
a plurality of blade platforms arranged around a circumference of the turbine rotor hub, each of plurality of blade platforms carrying a turbine blade,
a plurality of cooling air chambers, with each of the cooling air chambers positioned between a respective pair of adjacent blade platforms of the plurality of blade platforms, each of the cooling air chambers for passing through cooling air,
a plurality of platform intermediate gaps, with each of the platform intermediate gaps positioned between the respective pair of the adjacent blade platforms of the plurality of blade platforms,
at least one chosen from a plurality of damping elements and a plurality of sealing elements, with each of the plurality of damping elements or each of the plurality of sealing elements arranged radially beneath a respective one of the plurality of platform intermediate gaps,
a plurality of outflow pockets, with each of the outflow pockets positioned adjacent the respective one of the plurality of platform intermediate gaps, open to a platform upper side and connected to a respective one of the plurality of cooling air chambers,
a plurality of cooling air pockets, with each of the cooling air pockets connecting between a respective one of the plurality of outflow pockets and a respective one of the cooling air chambers, each of the cooling air pockets provided in a wall of a respective one of the cooling air chambers and opening radially inwardly towards the respective one of the cooling air chambers and also opening toward at least one chosen from a respective one of the plurality of damping elements, a respective one of the plurality of sealing elements and the respective one of the plurality of platform intermediate gaps;
wherein at least one of the plurality of cooling air pockets is convergent or divergent as it moves away from the respective one of the cooling air chambers.

15. A rotor of a turbine of a gas turbine comprising:
a turbine rotor hub, a plurality of blade platforms arranged around a circumference of the turbine rotor hub, each of plurality of blade platforms carrying a turbine blade, a plurality of cooling air chambers, with each of the cooling air chambers positioned between a respective pair of adjacent blade platforms of the plurality of blade platforms, each of the cooling air chambers for passing through cooling air, a plurality of platform intermediate gaps, with each of the platform intermediate gaps positioned between the respective pair of the adjacent blade platforms of the plurality of blade platforms, at least one chosen from a plurality of damping elements and a plurality of sealing elements, with each of the plurality of damping elements or each of the plurality of sealing elements arranged radially beneath a respective one of the plurality of platform intermediate gaps, a plurality of outflow pockets, with each of the outflow pockets positioned adjacent the respective one of the plurality of platform intermediate gaps, open to a platform upper side and connected to a respective one of the plurality of cooling air chambers, a plurality of cooling air pockets, with each of the cooling air pockets connecting between a respective one of the plurality of outflow pockets and a respective one of the cooling air chambers, each of the cooling air pockets provided in a wall of a respective one of the cooling air chambers and opening radially inwardly towards the respective one of the cooling air chambers and also opening toward at least one chosen from a respective one of the plurality of damping elements, a respective one of the plurality of sealing elements and the respective one of the plurality of platform intermediate gaps;

at least one chosen from:
1) at least one of the plurality of outflow pockets includes at least one chosen from rounded edges and surfaces freely merging into one another, and
2) wherein a wall of at least one of the plurality of cooling air pockets is rounded or includes surfaces freely merging into one another.

\* \* \* \* \*